B. K. ALBRECHT.
APPARATUS FOR INJECTING BRINE INTO MEAT.
APPLICATION FILED SEPT. 16, 1915.
1,192,596.
Patented July 25, 1916.
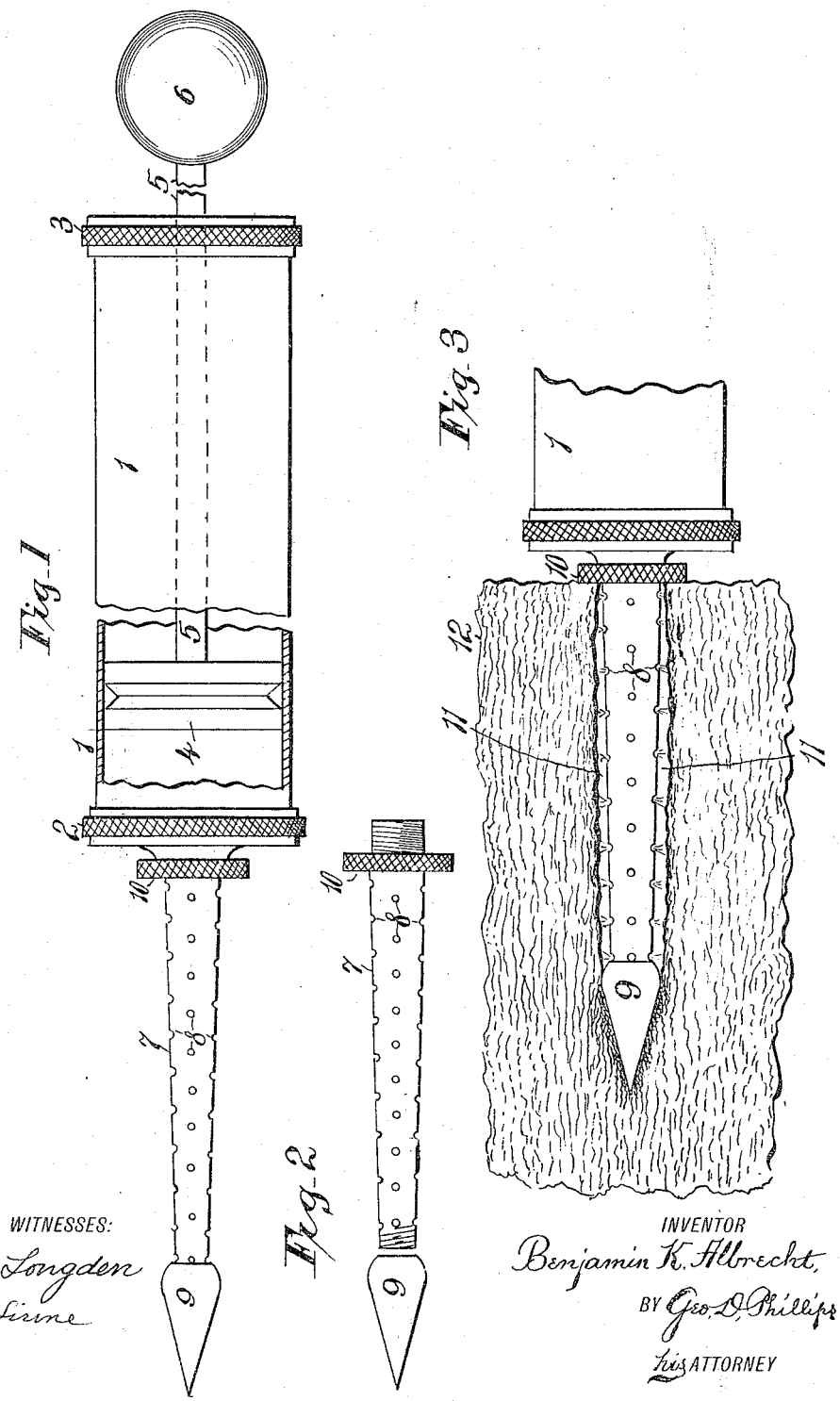
WITNESSES:
R. H. Longden
F. J. Sirine
INVENTOR
Benjamin K. Albrecht,
BY Geo. D. Phillips
his ATTORNEY

UNITED STATES PATENT OFFICE.

BENJAMIN K. ALBRECHT, OF ROWAYTON, CONNECTICUT.

APPARATUS FOR INJECTING BRINE INTO MEAT.

1,192,596.　　　　　　　Specification of Letters Patent.　　　Patented July 25, 1916.

Application filed September 16, 1915.　Serial No. 50,965.

*To all whom it may concern:*

Be it known that I, BENJAMIN K. ALBRECHT, citizen of the United States, residing at Rowayton, in the county of Fairfield and State of Connecticut, have invented certain new and useful Improvements in an Apparatus for Injecting Brine Into Meat; and I do hereby declare the following to be a full, clear, and exact description of the invention, such as will enable others skilled in the art to which it appertains to make and use the same.

My invention relates to an apparatus for injecting brine into meat, and it consists principally in the peculiar construction of the nozzle.

Referring to the accompanying drawings in which: Figure 1 represents a broken view partly in section of the brine reservoir or barrel, and broken view of the plunger rod; Fig. 2 is a detail view of the nozzle equipped with a detachable pointed head; and Fig. 3 is a view of the nozzle of the device inserted into a piece of meat and broken view of the barrel.

The brine reservoir consists of the body or barrel 1 having the removable end caps 2 and 3, plunger 4, its rod 5 and handle 6. The hollow nozzle 7 has the holes 8 through which the brine is forced from the barrel, and the forward end is equipped with the sharp pointed entering head 9 which may be an integral part of the nozzle or detachable as shown in Fig. 2. The nozzle is tapered from the shoulder 10 to the head, and the greatest diameter of the head and the base of the nozzle at said shoulder are practically the same, or, at least, greater than the diameter of other portions of the nozzle. The purpose of this arrangement is not only to keep the nozzle out of direct contact with the meat and thus avoid shredding the same and clogging up the holes in the nozzle with the shredded particles of meat and thus detract from the efficiency of the device, but it also forms the open chamber 11 for the reception of a greater quantity of brine than could otherwise be accomplished. Another very important feature of this arrangement is that it is strictly sanitary, as no particles of meat can adhere to the nozzle when the same is withdrawn. In operating the device, the pointed nozzle is forced into the meat 12, as shown in Fig. 3, and the plunger will force the brine through the holes 8 into the chamber 11, and when the nozzle is withdrawn, the opening in the meat will instantly close and the brine will be readily absorbed by the meat, and the curing process made much shorter by the use of the enlarged head than were the head and body of the nozzle of the same size.

Having thus described my invention, what I claim is:—

1. A meat salting tool comprising a brine reservoir and means for ejecting the brine therefrom, a meat penetrating nozzle communicating with the reservoir and having discharge openings, and a pointed head surmounting the nozzle and being of greater diameter than the major portion of the nozzle to prevent the said nozzle contacting with the meat.

2. A meat salting tool comprising a brine reservoir and means for ejecting the brine therefrom, a hollow nozzle communicating with the reservoir, and having discharge openings therein, a pointed head surmounting the nozzle, the nozzle tapered from its base to the head, the diameter of the base and head greater than the rest of the nozzle, so that a chamber is formed about that portion of the nozzle between said base and head when the nozzle is inserted into a piece of meat.

In testimony whereof I affix my signature in presence of two witnesses.

BENJAMIN K. ALBRECHT.

Witnesses:
　CHAS. E. GOETZ,
　JOHN E. FUCHS.

Copies of this patent may be obtained for five cents each, by addressing the "Commissioner of Patents, Washington, D. C."